United States Patent
Yokoyama et al.

(10) Patent No.: US 6,999,668 B2
(45) Date of Patent: Feb. 14, 2006

(54) METHOD FOR MANUFACTURING OPTICAL WAVEGUIDE DEVICE, OPTICAL WAVEGUIDE DEVICE, AND COHERENT LIGHT SOURCE AND OPTICAL APPARATUS USING THE OPTICAL WAVEGUIDE DEVICE

(75) Inventors: Toshifumi Yokoyama, Katano (JP); Kiminori Mizuuchi, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 43 days.

(21) Appl. No.: 10/336,416

(22) Filed: Jan. 2, 2003

(65) Prior Publication Data

US 2003/0133680 A1 Jul. 17, 2003

(30) Foreign Application Priority Data

Jan. 9, 2002 (JP) ............................. 2002-001985

(51) Int. Cl.
*G02B 6/10* (2006.01)
(52) U.S. Cl. ....................................... 385/129; 385/131
(58) Field of Classification Search ......... 385/129–132
See application file for complete search history.

(56) References Cited

U.S. PATENT DOCUMENTS

| | | | |
|---|---|---|---|
| 3,374,001 A * | 3/1968 | Baudou | 280/610 |
| 4,948,219 A * | 8/1990 | Seino et al. | 385/95 |
| 6,069,081 A | 5/2000 | Kelleher et al. | |
| 6,208,791 B1 * | 3/2001 | Bischel et al. | 385/129 |
| 6,374,001 B1 * | 4/2002 | Bozeat et al. | 385/8 |
| 6,408,116 B1 * | 6/2002 | Izawa | 385/37 |
| 6,614,966 B2 * | 9/2003 | Kitaoka et al. | 385/52 |

FOREIGN PATENT DOCUMENTS

JP 3213235 7/2001

* cited by examiner

*Primary Examiner*—Frank G. Font
*Assistant Examiner*—Eric Wong
(74) *Attorney, Agent, or Firm*—Hamre, Schumann, Mueller & Larson, P.C.

(57) ABSTRACT

The invention provides a method for manufacturing an optical waveguide device, with which the thickness of an optical substrate can be controlled with high precision. The surface of a substrate is masked by applying a resist to all regions of the substrate except where stopper portions are to be formed (i.e. to the left and right in width direction of the substrate). Then, the stopper portions are formed on the surface of the substrate by sputtering/vapor deposition of Cr, and then the resist is removed. Using a UV curing resin, an Mg-doped $LiNbO_3$ optical substrate is laminated between the pair of stopper portions to the left and right of the surface of the substrate. After laminating the optical substrate, which is made of a non-linear optical material, the optical substrate is abraded.

14 Claims, 13 Drawing Sheets

METHOD FOR MANUFACTURING OPTICAL WAVEGUIDE DEVICE, OPTICAL WAVEGUIDE DEVICE, AND COHERENT LIGHT SOURCE AND OPTICAL APPARATUS USING THE OPTICAL WAVEGUIDE DEVICE

FIELD OF THE INVENTION

The present invention relates to methods for manufacturing optical waveguide devices, to optical waveguide devices and to coherent light sources and optical apparatuses using such optical waveguide devices.

BACKGROUND OF THE INVENTION

In apparatuses for recording/reproducing optical information, higher densities can be attained by using a light source of a shorter wavelength. For example, in compact disk (CD) players, which have been popular for some time, near-infrared light of 780 nm wavelength is used, whereas digital versatile disk (DVD) players, in which information is reproduced at higher densities, use a red semiconductor laser of 650 nm wavelength. In order to realize the next-generation disk players with even higher densities, research in blue laser light sources of even shorter wavelengths is intense. In order to realize a blue laser light source that is compact and stable, wavelength conversion elements using non-linear optical materials are being researched, and for devices using non-linear optical crystals, there are quasi-phase-matching optical waveguide-type wavelength conversion devices.

One approach to realize optical waveguide-type wavelength conversion devices is the ridge-type optical waveguide device shown in FIG. 12. This optical waveguide device 48 is made of a ridge portion 52 and periodic polarization inversion regions 51 provided on an X-cut Mg-doped $LiNbO_3$ substrate 49. The refractive index of the ridge portion 52 is higher than the refractive index around it, so that the vicinity of the ridge portion 52 functions as an optical waveguide 50 and light is guided inside this optical waveguide 50. Laser light that is guided inside the optical waveguide 50 is converted into light of ½ the wavelength. The optical waveguide device 48 provided with the ridge portion 52 can use the crystal itself as a waveguide layer, so that the problem of deterioration of the non-linearity, which occurs in optical waveguides using conventional ion-exchange, does not occur, and a highly efficient wavelength conversion can be achieved. Thus, using the ridge-type optical waveguide device 48, a violet optical output of 410 nm wavelength can be obtained from red input light of 820 nm wavelength.

A method for manufacturing the ridge-type optical waveguide device is described briefly with reference to FIG. 13. First, as shown in FIG. 13A, an optical substrate 1 is laminated to the surface of a substrate 2 of about 1 mm thickness using an ultraviolet (UV) curing resin 3. Then, as shown in FIG. 13B, the surface of the optical substrate 1 is abraded. Here, the optical substrate 1, which is laminated to the substrate 2, is abraded to a thickness of 3.5 μm. Finally, grooves 4 are formed in the surface of the abraded optical substrate 1 by laser processing, as shown in FIG. 13C. Thus, a ridge-type optical waveguide 5 is obtained, finishing the ridge-type optical waveguide device.

However, in order to form the ridge-type optical waveguide, it is necessary to control the thickness of the optical substrate 1 in the abrasion step with high precision, because if the thickness of the optical substrate is not controlled at high precision, the light in the ridge-type waveguide is not guided anymore. Yet in the actual abrasion step, the thickness of the optical substrate 1 could not be controlled precisely, resulting in thickness variations of ±1 μm or more, and the yield was very poor. Furthermore, since the abrasion was carried out while measuring the thickness of the optical substrate 1 in order to perform abrasion at high precision, considerable time was needed for the formation of the ridge-type optical waveguide. In addition, control of the abrasion time was necessary.

There were the following further problems in the fabricated optical waveguide devices.

When using optical wavelength conversion elements utilizing an optical waveguide, a highly efficient wavelength conversion becomes possible, but in order to improve the conversion efficiency and realize high power characteristics, it is necessary to propagate the guided wave at high power densities within the optical waveguide. For example, in order to obtain second harmonic generation (SHG) light of several 10 mW, at least twice the power is required for the fundamental wave. At present, light sources used in optical disk devices produce short wavelengths of several 10 mW, and even higher powers are required. Moreover, a high power guided wave is required for the optical waveguide device itself For example, new applications in optical waveguide switches and modulators used for communication or sensors can be developed by raising the power of the guided wave.

However, if the power of the guided wave propagated in the optical waveguide is increased, the temperature of the optical waveguide is increased due to absorption of the guided wave. A guided wave of several mW is not all that problematic, but in the case of a guided wave of several 10 mW, even a slight absorption can lead to a large temperature increase in optical waveguides with high power densities. The problem of temperature increase due to absorption of the guided wave becomes even more serious with shorter wavelengths. The inventors of the present invention have found in the course of developing high-power optical wavelength conversion elements that a temperature increase of the optical waveguide may become a cause for a deterioration of the power of the optical wavelength conversion element. Furthermore, the inventors of the present invention also found that when the power of the guided wave is increased in conventional optical waveguide devices, the temperature of the waveguide layer increases due to absorption of the guided wave, which leads to the problem of deteriorated characteristics and shorter device lifetime.

It is thus an object of the present invention to provide a method for manufacturing an optical waveguide device in which the thickness of an optical substrate can be controlled with high precision when manufacturing the optical waveguide device, and a shortening of the manufacturing time can be achieved. It is a further object of the present invention to provide an optical waveguide device, in particular a ridge-type optical waveguide device as necessitated by high-power guided waves, as well as a coherent light source and an optical apparatus using this optical waveguide device, with which a deterioration of the characteristics caused by temperature increases due to absorption of the guided wave can be avoided, and even if the guided wave is absorbed, the resulting temperature increase can be kept low and the temperature distribution can be made uniform, thus achieving more stable characteristics.

SUMMARY OF THE INVENTION

In order to achieve this object, a first method for manufacturing an optical waveguide device in accordance with the present invention includes a step of abrading an optical substrate to a desired thickness, wherein the abrasion of the optical substrate is performed using a stopper portion regulating the thickness of the optical substrate.

With this first method for manufacturing an optical waveguide device, the thickness of the optical substrate is controlled by the stopper portion, so that it is possible to reduce variations in the thickness of the optical substrate. As a result, the manufacturing yield of the optical waveguide device is improved considerably. Furthermore, it is not necessary to perform the abrasion while measuring the thickness of the optical substrate, so that it is easy to adjust the abrasion time, and a considerable shortening of the manufacturing time can be achieved.

Furthermore, in this first method of manufacturing an optical waveguide device in accordance with the present invention, it is preferable that a hardness of the stopper portion is larger than a hardness of the optical substrate. With this preferable configuration, the abrasion rate drops considerably when the stopper portion is reached during the abrasion of the optical substrate, so that the thickness of the optical substrate can be controlled with high precision to the thickness of the stopper portion.

In the first method of manufacturing an optical waveguide device in accordance with the present invention, it is preferable that the stopper portion is formed by vapor deposition or plating.

In the first method of manufacturing an optical waveguide device in accordance with the present invention, it is preferable that the stopper portion is buried in the optical substrate. In this case, it is preferable that the stopper portion is buried in a groove formed in the optical substrate. And in this case, it is further preferable that the groove is made by ion milling or etching.

In the first method of manufacturing an optical waveguide device in accordance with the present invention, it is preferable that the stopper portion is at least 0.1 $\mu$m and at most 10 $\mu$m thick.

In the first method of manufacturing an optical waveguide device in accordance with the present invention, it is preferable that the stopper portion is made of one material selected from the group consisting of Ta, Cr, W, Ti, Si and $SiO_2$.

In the first method of manufacturing an optical waveguide device in accordance with the present invention, it is preferable that the stopper portion is stripe-shaped and arranged parallel to an optical waveguide.

In the first method of manufacturing an optical waveguide device in accordance with the present invention, it is preferable that the stopper portion is arranged at a distance of at least 20 $\mu$m and at most 100 $\mu$m from an optical waveguide.

A second method for manufacturing an optical waveguide device includes a step of abrading an optical substrate to a desired thickness, wherein a reflecting surface is formed on the optical substrate, and the optical substrate is abraded while optically measuring a thickness of the optical substrate using the reflecting surface.

With this second method for manufacturing an optical waveguide device, the thickness of the optical substrate can be controlled with high precision and variations of the thickness of the optical substrate can be reduced by terminating the abrasion of the optical substrate when the light reflected from the reflecting surface has disappeared. As a result, the manufacturing yield of the optical waveguide device is improved considerably. Furthermore, it is not necessary to perform the abrasion while measuring the thickness of the optical substrate, so that it is easy to adjust the abrasion time, and a considerable shortening of the manufacturing time can be achieved.

In the second method of manufacturing an optical waveguide device in accordance with the present invention, it is preferable that a plurality of the reflective surfaces are provided inside the optical substrate.

A third method for manufacturing an optical waveguide device includes a step of abrading an optical substrate to a desired thickness, wherein a depression is formed in the optical substrate, a substrate provided with a protrusion fitting into the depression is prepared, a metal film is formed on the surface of the optical substrate in which the depression is provided and/or the surface of the substrate provided with the protrusion, the optical substrate and the substrate are laminated together such that the protrusion fits into the depression, and then the optical substrate is abraded.

With this third method for manufacturing an optical waveguide device, the thickness of the optical substrate is controlled by the metal film, so that it is possible to reduce variations in the thickness of the optical substrate. As a result, the manufacturing yield of the optical waveguide device is improved. Furthermore, it is not necessary to perform the abrasion while measuring the thickness of the optical substrate, so that it is easy to adjust the abrasion time, and a considerable shortening of the manufacturing time can be achieved.

In the third method of manufacturing an optical waveguide device in accordance with the present invention, it is preferable that a hardness of the metal film is larger than a hardness of the optical substrate. With this preferable configuration, the abrasion rate drops considerably when the metal film is reached during the abrasion of the optical substrate, so that the thickness of the optical substrate can be controlled with high precision by the metal film.

In the third method of manufacturing an optical waveguide device in accordance with the present invention, it is preferable that the optical substrate and the substrate are laminated together by metal bonding.

In the third method of manufacturing an optical waveguide device in accordance with the present invention, it is preferable that the protrusion is at least 0.1 $\mu$m and at most 10 $\mu$m thick.

In the third method of manufacturing an optical waveguide device in accordance with the present invention, it is preferable that the metal film is made of one material selected from the group consisting of Ta, Cr, W, Ti and Si.

In the third method of manufacturing an optical waveguide device in accordance with the present invention, it is preferable that the protrusion is stripe-shaped and arranged parallel to an optical waveguide.

In the third method of manufacturing an optical waveguide device in accordance with the present invention, it is preferable that the protrusion is arranged at a distance of at least 20 $\mu$m and at most 100 $\mu$m from the optical waveguide.

A optical waveguide device in accordance with the present invention includes a waveguide layer, a buffer layer formed on one surface of the waveguide layer, and a substrate bonded to a surface of the buffer layer via a bonding layer, wherein the bonding layer is made of metal.

With this optical waveguide device, by using a metal for the bonding layer bonding the waveguide layer and the substrate, it is possible to reduce temperature gradients occurring in the propagation direction of the waveguide layer considerably and considerably improve the high-power characteristics when the optical waveguide device is used as an SHG element. Furthermore, using a metal for the bonding layer reduces variations in the thickness of the bonding layer. As a result, variations in the thickness of the waveguide layer are reduced, and it is possible to improve the conversion efficiency and the yield when the optical waveguide device is used as an optical conversion element.

It is preferable that the optical waveguide device in accordance with the present invention further includes a stripe-shaped protrusion on at least one of a top surface and a bottom surface of the waveguide layer, wherein the waveguide layer including the protrusion fulfills the conditions for single-mode propagation with respect to an incident light wave. In this case, it is preferable that the bonding layer includes window portions at which a predetermined portion of the bonding layer has been removed, and that the window portions are provided at regions that are not directly below the stripe-shaped protrusion.

In the optical waveguide device in accordance with the present invention, it is preferable that the buffer layer is made of a dielectric material that has an absorption coefficient of not greater than $10^{-4}$ with respect to a guided wave that is propagated by the waveguide layer, and the refractive index and the thickness of the buffer layer are set to values at which the electric field distribution of the guided wave propagated by the waveguide layer does not extend into the bonding layer.

In the optical waveguide device in accordance with the present invention, it is preferable that the bonding layer has a multi-layer structure in which different kinds of metals are layered, and the metals constituting the bonding layer include a low-melting point metal.

In the optical waveguide device in accordance with the present invention, it is preferable that the thermal expansion coefficients of the substrate and the waveguide layer are substantially the same within a bonding plane.

In the optical waveguide device in accordance with the present invention, it is preferable that the waveguide layer comprises a periodic polarization reversal structure. In this case, it is preferable that the optical waveguide device is a wavelength conversion device that converts the wavelength of a fundamental wave to its second harmonic wave, and the buffer layer is made of a material that is transparent with respect to the fundamental wave and the second harmonic wave.

In the optical waveguide device in accordance with the present invention, it is preferable that the bonding layer has been removed near an in-coupling end face of the waveguide layer.

In the optical waveguide device in accordance with the present invention, it is preferable that the waveguide layer is made of an off-cut substrate of Mg-doped $LiNbO_3$, and has a periodic polarization reversal structure, and a fundamental wave propagated by the waveguide layer is converted into its second harmonic wave. It also is preferable that the buffer layer has an absorption coefficient that is not greater than $10^{-4}$ with respect to the fundamental wave and the second harmonic wave, and is thick enough that the electric field distributions of the fundamental wave and the second harmonic wave do not extend into the bonding layer.

A coherent light source in accordance with the present invention includes a submount, a semiconductor laser fixed on the submount, and an optical waveguide device according to the present invention fixed on the submount, wherein light from the semiconductor laser is coupled into the waveguide layer of the optical waveguide device.

With this coherent light source, an optical waveguide device is used that improves the high-power characteristics when used for an SHG element, and that improves the conversion efficiency when used for an optical conversion element, so that a high-power coherent light source of short wavelength can be accomplished.

In the coherent light source in accordance with the present invention, it is preferable that the optical waveguide device is fixed on the submount with a UV curing resin.

It is preferable that the optical waveguide device in accordance with the present invention further includes a protective film on a surface of the optical waveguide device.

In the coherent light source in accordance with the present invention, it is preferable that the optical waveguide device is covered by a material with a thermal conductivity coefficient of at least 30 $W \cdot m^{-1} \cdot K^{-1}$.

An optical apparatus in accordance with the present invention includes a coherent light source according to the present invention, and a light-focusing optical system that focuses light emitted from the coherent light source onto an observed object.

This optical apparatus uses a short-wavelength high-power coherent light source in accordance with the present invention, so that it is possible to write onto two-layered optical disks, which is difficult with low-power light sources.

In the optical apparatus in accordance with the present invention, it is preferable that the observed object is an optical disk.

DESCRIPTION OF THE PREFERRED EMBODIMENTS

Figure 1A:
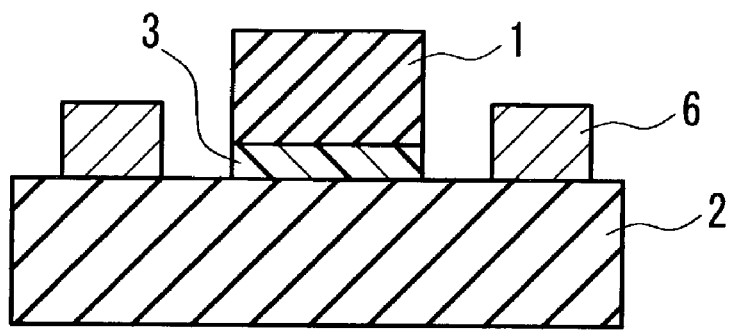
FIG. 1 is a process diagram illustrating a method for manufacturing an optical waveguide device according to a first embodiment of the present invention.

The following is a more specific description of the present invention using preferred embodiments.

First Embodiment

A first embodiment of the present invention is described with reference to FIG. 1. FIG. 1 is a process diagram illustrating a method for manufacturing an optical waveguide device according to the first embodiment of the present invention. In this embodiment, a Mg-doped $LiNbO_3$ substrate of 0.5 mm thickness and 1 mm width was used for the optical substrate 1. A Mg-doped $LiNbO_3$ substrate of about 1 mm thickness was used for the substrate 2.

First, the surface of the substrate 2 was masked by applying a resist to the region outside the regions where stopper portions 6 are to be formed (on the left and the right side of the substrate 2 with respect to the width direction). Then, the stopper portions 6 were formed by sputtering/vapor deposition of Cr onto the surface of the substrate 2, whereafter the resist was removed. After that, the optical substrate 1 was laminated onto the substrate 2 between the left and right stopper portions 6 using a UV curing resin 3 (see FIG. 1A). Here, the thickness of the UV curing resin 3 was set to 0.5 $\mu$m, the thickness of the stopper portions 6 was set to 4 $\mu$m, and their width was set to 50 $\mu$m. In order to attain a ridge-type optical waveguide 12 with favorable light confinement (see FIG. 1D), it is preferable that the thickness of the stopper portions 6 is not greater than 10 $\mu$m. Furthermore, if the thickness of the stopper portions 6 is less than 0.1 $\mu$m, then the guiding of light with the resulting optical waveguide becomes difficult, which is undesirable. Besides Cr, it is also possible to use Si, $SiO_2$ or Ta as the material for the stopper portions 6. As the stopper material, these materials are easily obtainable and the thickness of the stopper portions 6 can be controlled with high precision by vapor deposition. Other examples of materials for the optical substrate 1 besides $LiNbO_3$ include $LiTaO_3$, KTP ($KTiOPO_4$), $KNbO_3$, $KLiNbO_3$, BBO ($BaB_2O_4$), LBO ($LiB_3O_5$), and CLBO ($CsLiB_6O_{10}$). Moreover, the stopper portions 6 are formed by sputtering/vapor deposition, by which the thickness of the stopper portions 6 can be controlled to the molecule level, i.e. to very high precision. It should be noted that, besides vapor deposition methods such as sputtering, plating is another example of a method by which the thickness of the stopper portions 6 can be controlled with high precision. Also if the stopper portions 6 are formed by plating, the thickness of the stopper portions 6 can be controlled to the molecular level.

Figure 1B:
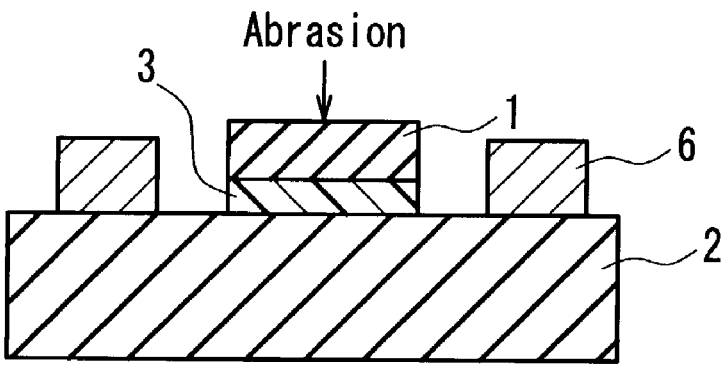
Figure 1C:
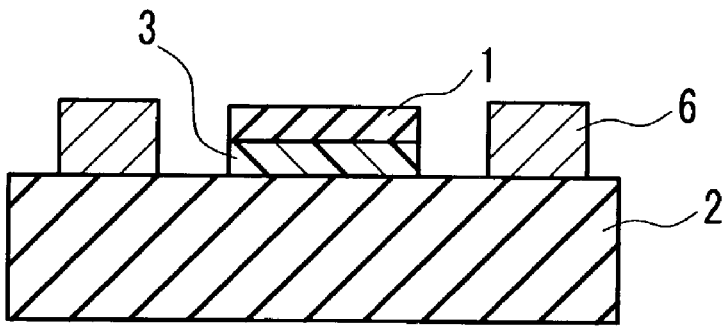

Next, after the optical substrate 1, which is a non-linear optical material, has been laminated to the substrate 2 as described above, the optical substrate 1 is abraded as shown in FIG. 1B. Since the Cr of which the stopper portions 6 are made is harder than the Mg-doped $LiNbO_3$ of which the optical substrate 1 is made, the proportion at which the stopper portions 6 are abraded (referred to as "abrasion rate" in the following) is smaller than that of the optical substrate 1. More specifically, the Moh's hardness of the $LiNbO_3$ is 4.5, whereas that of the Cr is 9. Examples of other materials besides Cr whose hardness is greater than that of $LiNbO_3$ include Si (with a hardness of about 7), $SiO_2$ (with a hardness of 6.5), Ta (with a hardness of 6.5), W (with a hardness of 8.9), and Ti (with a hardness of 6.5).

During the abrasion of the optical substrate 1, the abrasion rate decreases significantly when reaching the stopper portions 6, so that the thickness of the optical substrate 1 can be controlled with high precision to the thickness of the stopper portions 6. Since the thickness of the stopper portions 6 is 4 $\mu$m, and the thickness of the UV curing resin 3 is 0.5 $\mu$m, the thickness of the optical substrate 1 was controlled to 3.5 $\mu$m (see FIG. 1C).

Figure 1D:
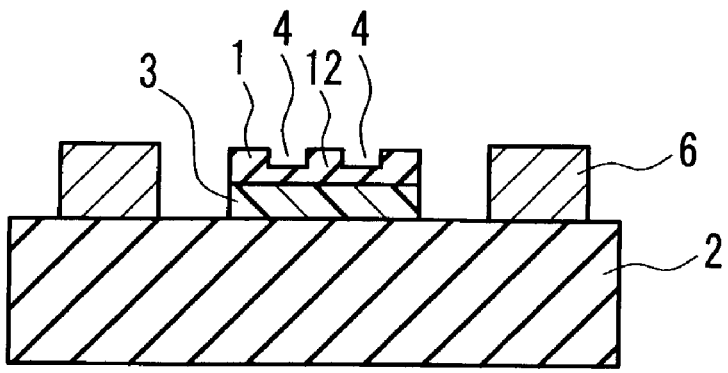

Finally, as shown in FIG. 1D, grooves 4 were formed in the surface of the optical substrate 1 by laser processing. Thus, a ridge-type optical waveguide 12 was obtained.

It is desirable that the stopper portions 6 are stripe-shaped and that they are arranged parallel to the ridge-type optical waveguide 12.

Furthermore, it is desirable that the distance between the ridge-type optical waveguide 12 and the stopper portions 6 is at least 20 $\mu$m and at most 100 $\mu$m. If the distance between the ridge-type optical waveguide 12 and the stripe-shaped stopper portions 6 is less than 20 $\mu$m, then the stopper portions 6 may affect the guided wave in the ridge-type optical waveguide 12, which may lead to an increase in waveguide loss. If the distance between the ridge-type optical waveguide 12 and the stripe-shaped stopper portions 6 is larger than 100 $\mu$m, then it is difficult to improve the uniformity of the thickness of the optical substrate 1 due to abrasion.

As described above, after forming the stopper portions 6 using a material that is harder than the optical substrate 1, the thickness of the optical substrate 1 is controlled with high precision by abrading the optical substrate 1, and variations in the thickness of the optical substrate 1 of about ±0.1 $\mu$m can be attained. As a result, the production yield of the ridge-type optical waveguide device can be improved considerably.

Furthermore, when the stopper portions 6 are reached, the abrasion proceeds suddenly very slowly, and the thickness of the optical substrate 1 is kept for some time at the thickness of the stopper portions 6. The abrasion selectivity between the optical substrate 1 and the stopper portions 6 can be made large by using chemical polishing for the abrasion method and intensifying the chemical reaction aspect. If chemical abrasion is employed, then Ni is suitable as the material for the stopper portions 6, because Ni is chemically stable and not easily abraded. Moreover, Ni can be deposited with high hardness on the optical substrate 1 by electroless plating.

Consequently, using the method for manufacturing an optical waveguide device of the present embodiment, it is not necessary to abrade the optical substrate 1 while measuring its thickness, so that it is easy to adjust the abrasion time, and a considerable shortening of the manufacturing time can be achieved.

Second Embodiment

Next, a second embodiment of the present invention is described with reference to FIG. 2. FIG. 2 is a process diagram illustrating a method for manufacturing an optical waveguide device according to the second embodiment of the present invention. In this embodiment, a Mg-doped $LiNbO_3$ substrate of 0.5 mm thickness and 3 mm width was used for the optical substrate 1. And similar to the first embodiment, a Mg-doped $LiNbO_3$ substrate of about 1 mm thickness was used for the substrate 2.

First, grooves 1a, positioned to the left and right with respect to the width direction, were formed on the surface of the optical substrate 1. The grooves 1a were formed by ion milling. Using ion milling, the depth of the grooves 1a can be controlled to the molecular level, so that it is possible to form the grooves 1a with high precision. Other methods for forming the grooves 1a besides ion milling include etching processes such as dry etching. Here, the depth of the grooves 1a was set to 3.5 $\mu$m and the width was set to 50 $\mu$m. Next, a resist was applied to the regions where the grooves 1a have not been formed, thus masking the surface of the optical substrate 1 provided with the grooves 1a. Thereafter, stopper portions 7 were formed by vapor deposition of Cr in the surface of the optical substrate 1 provided with the grooves 1a, and then the resist was removed (see FIG. 2A). Thus, a situation was attained in which the stopper portions 7 are buried in the optical substrate 1. As in the first embodiment, other examples of suitable materials for the stopper portions 7 besides Cr include Si, $SiO_2$ and Ta. Furthermore, as in the first embodiment, it is desirable that the thickness of the stopper portions 7 does not exceed 10 $\mu$m, in order to obtain a ridge-type optical waveguide 12 with favorable light confinement (see FIG. 2D). Furthermore, if the thickness of the stopper portions 7 is less than 0.1 $\mu$m, then the guiding of light in the resulting optical waveguide becomes difficult, which is not desirable.

Figure 2A:
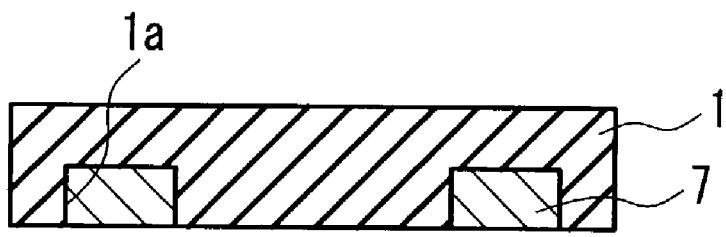
FIG. 2 is a process diagram illustrating a method for manufacturing an optical waveguide device according to a second embodiment of the present invention.
Figure 2B:
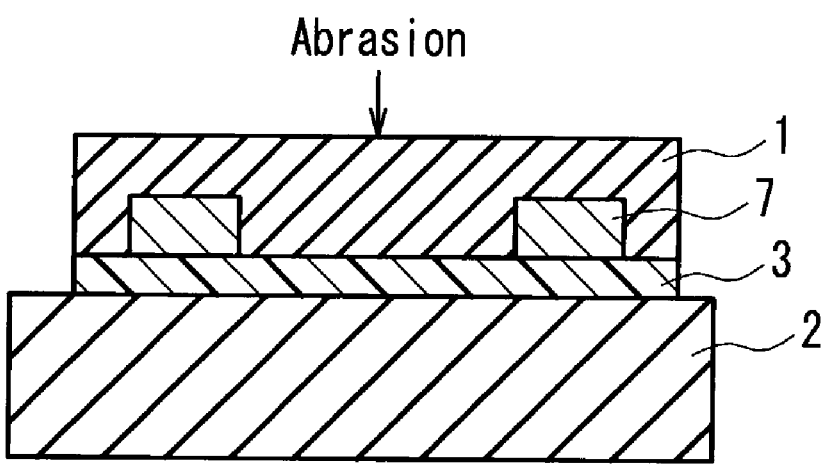
Figure 2C:
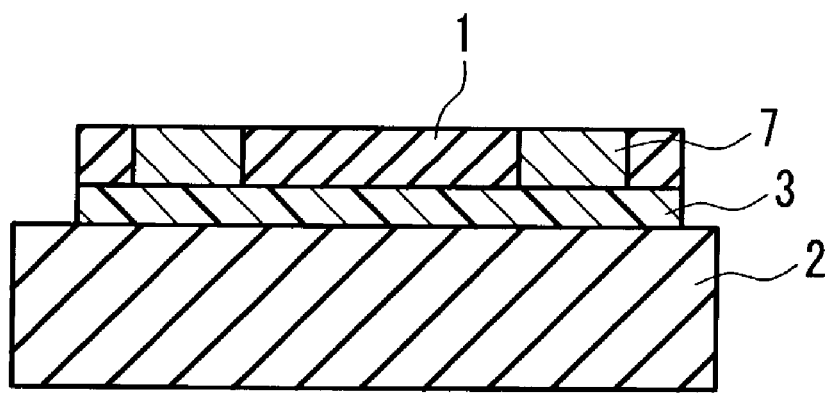

Next, as shown in FIG. 2B, the surface of the optical substrate 1 that has been provided with the stopper portions 7 was laminated to a substrate 2 with a UV curing resin 3. Then, after the optical substrate 1, which is made of a non-linear optical material, has been laminated to the substrate 2, the optical substrate 1 was abraded. The Cr of which the stopper portions 7 are made is harder than the Mg-doped $LiNbO_3$ of which the optical substrate 1 is made, so that the abrasion rate of the stopper portions 7 is smaller than that of the optical substrate 1. When the stopper portions 7 are reached during the abrasion of the optical substrate 1, the abrasion rate drops considerably, so that the thickness of the optical substrate 1 is controlled with high precision to the thickness of the stopper portions 7. Since the thickness of the stopper portions 7 (depth of the grooves 1a of the optical substrate 1) is 3.5 $\mu$m, the thickness of the optical substrate 1 is controlled to 3.5 $\mu$m (see FIG. 2C).

Figure 2D:
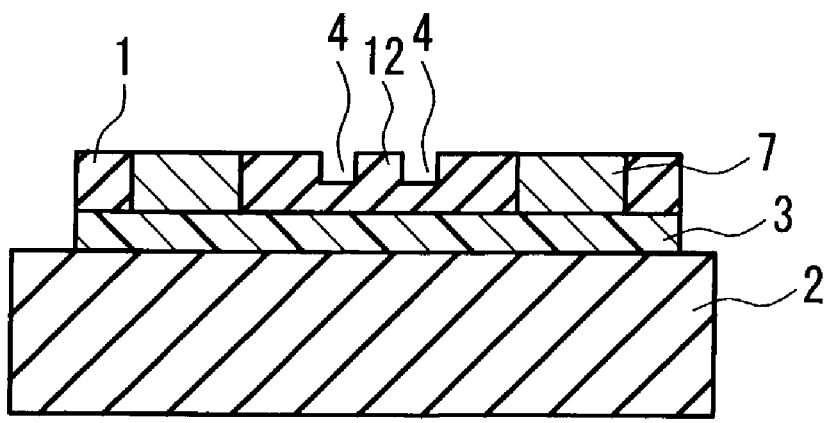

Finally, as shown in FIG. 2D, grooves 4 were formed in the surface of the optical substrate 1 by laser processing. Thus, a ridge-type optical waveguide 12 was obtained.

It is desirable that the stopper portions 7 are stripe-shaped and that they are arranged parallel to the ridge-type optical waveguide 12.

Furthermore, it is desirable that the distance between the ridge-type optical waveguide 12 and the stopper portions 7 is at least 20 $\mu$m and at most 100 $\mu$m. If the distance between the ridge-type optical waveguide 12 and the stripe-shaped stopper portions 7 is less than 20 $\mu$m, then the stopper portions 7 may affect the guided wave in the ridge-type optical waveguide 12, which may lead to an increase in waveguide loss. If the distance between the ridge-type optical waveguide 12 and the stripe-shaped stopper portions 7 is larger than 100 $\mu$m, then it is difficult to improve the uniformity of the thickness of the optical substrate 1 due to abrasion.

As described above, after forming the grooves 1a in the optical substrate 1 and forming the stopper portions 7 in the grooves 1a using a material that is harder than the optical substrate 1, the thickness of the optical substrate 1 is controlled with high precision by abrading the optical substrate 1 from the side opposite to the side where the stopper portions 7 have been formed, and variations in the thickness of the optical substrate 1 of about ±0.1 $\mu$m can be attained. As a result, the manufacturing yield of the ridge-type optical waveguide device can be improved considerably. Furthermore, by providing the stopper portions 7 in the grooves 1a formed in the optical substrate 1, the surface area of the optical substrate 1 over which the thickness is controlled can be increased, so that it is possible to form more ridge-type optical waveguides 12. Moreover, the position of the grooves 1a formed in the optical substrate 1 can be controlled with high precision by masking, so that it is also possible to utilize them as markers for the positioning of the optical substrate 1.

Furthermore, when the stopper portions 7 are reached, the abrasion proceeds suddenly very slowly, and the thickness of the optical substrate 1 is kept for some time at the thickness of the stopper portions 7. As in the first embodiment, the abrasion selectivity between the optical substrate 1 and the stoppers 7 can be made large by using chemical polishing for the abrasion and intensifying the chemical reaction aspect.

Consequently, as in the first embodiment, using the method for manufacturing an optical waveguide device of the present embodiment, it is not necessary to abrade the optical substrate 1 while measuring its thickness, so that it is easy to adjust the abrasion time, and a considerable shortening of the manufacturing time can be achieved.

Third Embodiment

Next, a third embodiment of the present invention is described with reference to FIG. 3. FIG. 3 is a process diagram illustrating a method for manufacturing an optical waveguide device according to the third embodiment of the present invention. In this embodiment, a Mg-doped $LiNbO_3$ substrate of 0.5 mm thickness and 3 mm width was used for the optical substrate 1. And as in the first embodiment, a Mg-doped $LiNbO_3$ substrate of about 1 mm thickness was used for the substrate 2.

Figure 3A:
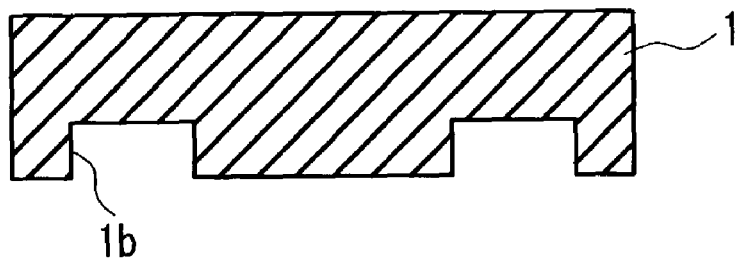
FIG. 3 is a process diagram illustrating a method for manufacturing an optical waveguide device according to a third embodiment of the present invention.
Figure 3B:
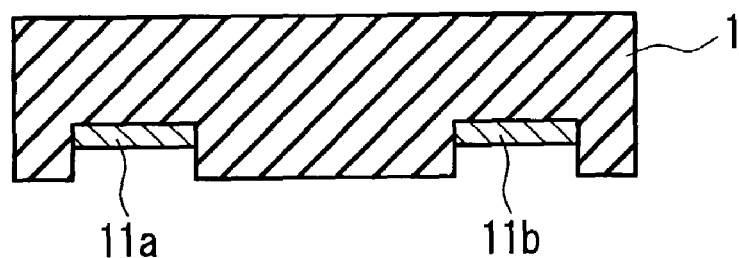
Figure 3C:
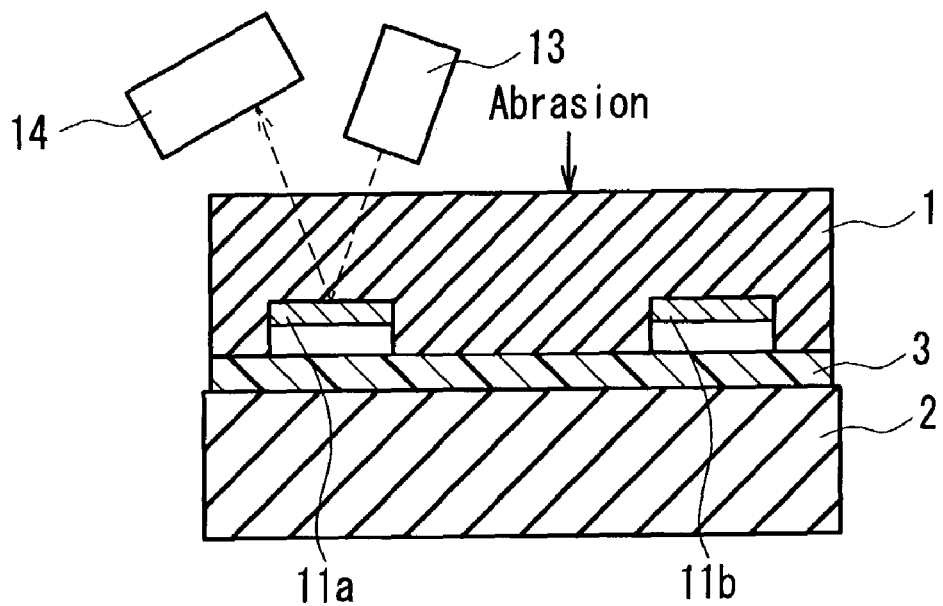
Figure 3D:
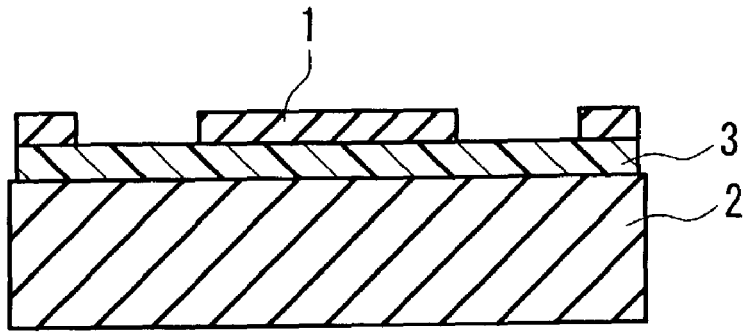

First, grooves 1b, positioned to the left and right with respect to the width direction, were formed on the surface of the optical substrate 1, as shown in FIG. 3A. As in the second embodiment, the grooves 1b were formed by ion milling. Here, the depth of the grooves 1b was set to 3.5 $\mu$m, and their width was set to 50 $\mu$m.

Next, resist was applied to the regions where the grooves 1b have not been formed, thus masking the surface of the optical substrate 1 provided with the grooves 1b. Thereafter, reflecting surfaces 11a and 11b were formed at the bottom of the grooves 1b by vapor deposition of Ta on the surface of the optical substrate 1 provided with the grooves 1b. Then, the resist was removed (see FIG. 3B).

Next, the surface of the optical substrate 1 that has been provided with the grooves 1b was laminated to a substrate 2 with a UV curing resin 3. Then, after the optical substrate 1, which is made of a non-linear optical material, has been laminated to the substrate 2, the optical substrate 1 was abraded. Here, the abrasion of the optical substrate 1 was performed while irradiating laser light from a light source 13 onto the reflecting surfaces 11a and 11b and monitoring the reflected light with a light-receiving element 14. Then, when the laser light is not reflected anymore by the reflecting surfaces 11a and 11b, the abrasion of the optical substrate 1 was terminated. In this case, the thickness of the optical substrate 1 was controlled to about 3.5 $\mu$m, that is, substantially the depth of the grooves 1b formed in the optical substrate 1 (see FIGS. 3C and 3D). Finally, as in the first and the second embodiments, grooves were formed in the surface of the optical substrate 1 by laser processing. Thus, a ridge-type optical waveguide was obtained.

With this embodiment, if the abrasion of the optical substrate 1 is carried out while monitoring the reflected light, the hardness of the reflecting films that are used for the reflecting surfaces 11a and 11b is not so problematic. Furthermore, the material of the reflecting films does not need to be a metal. However, it is generally desirable that the reflectivity of the reflecting surfaces 11a and 11b is high, and consequently, it is desirable to use a metal with high reflectivity, such as Al, Ag, Ni, Si, Au, Pt, Cr or the like for the reflecting films.

By vapor depositing a reflecting film on the bottom of the grooves 1b formed in the optical substrate 1 and abrading the optical substrate 1 while monitoring the presence of the reflecting films with laser light as described above, the thickness of the optical substrate 1 can be controlled with high precision, and variations in the thickness of the optical substrate 1 of about ±0.1 μm can be attained. As a result, the manufacturing yield of the ridge-type optical waveguide device can be improved considerably. Furthermore, by arranging a plurality of reflecting surfaces (11a, 11b) in the optical substrate 1, it is possible to control the thickness of the optical substrate 1 with high precision. That is to say, by checking for the presence of reflected light from the reflecting surface 11b when the reflected light from the other reflecting surface 11a has vanished during the abrasion of the optical substrate 1, it is possible to ascertain whether a flat abrasion is performed. If reflected light from the reflecting surface 11b is detected, then this means that the abrasion was tilted. In this case, it is possible to abrade the optical substrate 1 parallel to the substrate 2 by correcting the tilt and performing the abrasion until the reflected light from the reflecting surface 11b has vanished.

Thus, as in the first and second embodiments, using the method for manufacturing an optical waveguide device of the present embodiment, it is not necessary to abrade the optical substrate 1 while measuring its thickness, so that it is easy to adjust the abrasion time, and a considerable shortening of the manufacturing time can be achieved.

Fourth Embodiment

Next, a fourth embodiment of the present invention is described with reference to FIG. 4. FIG. 4 is a process diagram illustrating a method for manufacturing an optical waveguide device according to the fourth embodiment of the present invention. In this embodiment, a Mg-doped $LiNbO_3$ substrate of 0.5 mm thickness and 3 mm width was used for the optical substrate 1. A Mg-doped $LiNbO_3$ substrate of about 1 mm thickness was used for the substrate 2.

First, protrusions 8, positioned to the left and right with respect to the width direction, were formed on the surface of the substrate 2, whereafter a Cr film was vapor deposited as a metal film 9. The protrusions 8 were formed by ion milling. Here, the thickness of the protrusions 8 was set to 3.5 μm, their width was set to 50 μm, and the thickness of the Cr film was set to 0.5 μm. On the other hand, after vapor depositing a Cr film of 0.5 μm thickness serving as a metal film 10 also on the surface of the optical substrate 1, depressions 1c corresponding to the protrusions 8 were formed in the surface of the optical substrate 1 on the side where the metal film 10 has been formed. The depressions 1c were formed by dicing. Here, the depth of the depressions 1c was set to 100 μm and their width was set to 200 μm. Other examples of suitable materials for the metal films 9 and 10 besides Cr include Ta, Si, Ti and W. Furthermore, it is desirable that the thickness of the protrusions 8 does not exceed 10 μm, in order to obtain a ridge-type optical waveguide 12 with favorable light confinement (see FIG. 4D). Furthermore, if the thickness of the protrusions 8 is less than 0.1 μm, then the guiding of light in the resulting optical waveguide becomes difficult, which is not desirable.

Figure 4A:
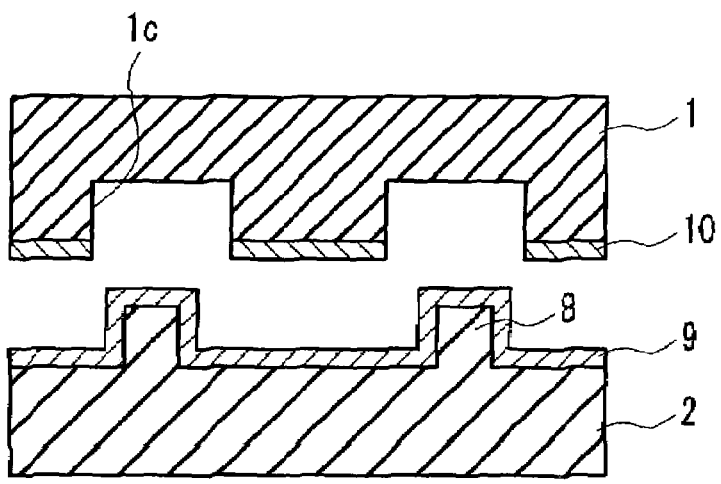
FIG. 4 is a process diagram illustrating a method for manufacturing an optical waveguide device according to a fourth embodiment of the present invention.
Figure 4B:
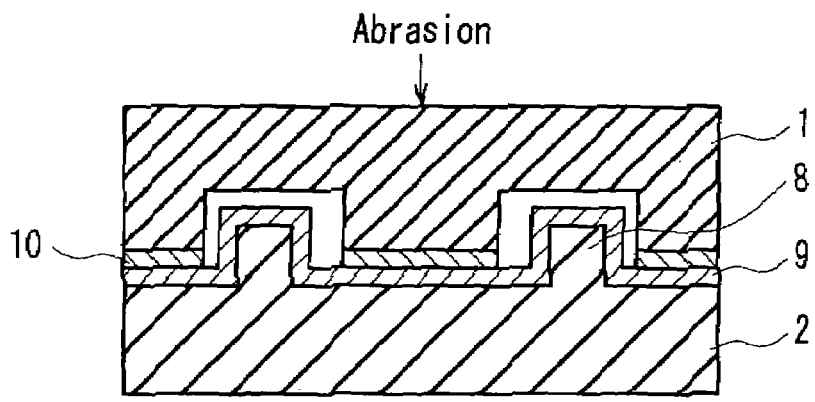
Figure 4C:
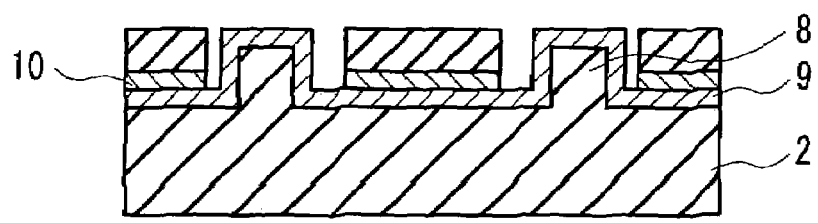

Next, as shown in FIG. 4B, the optical substrate 1 and the substrate 2 were positioned such that the protrusions 8 formed in the substrate 2 were fitted into the depressions 1c formed in the optical substrate 1, and the optical substrate 1 and the substrate 2 were laminated together. Metal bonding was used to laminate the optical substrate 1 and the substrate 2 together. That is to say, the optical substrate 1 and the substrate 2 were pressed together in a vacuum, and the metal films 9 and 10 made of Cr were bonded together by heating the metal films 9 and 10 to a high temperature. By using such metal bonding, the optical substrate 1 and the substrate 2 can be bonded together securely. Moreover, the thickness of the metal film 9 formed on the surface of the substrate 2 including the protrusions 8 can be controlled at high precision by using vapor deposition to form the metal film 9. It is also possible to laminate the optical substrate 1 and the substrate 2 by vapor depositing a low-melting point metal such as a soldering material on the optical substrate 1 and bond the two together by heat processing. Moreover, since the optical substrate 1 tends to warp under high-temperature processing, it is desirable to use a metal film whose temperature expansion coefficient is close to that of the optical substrate 1. Moreover, by making the thickness of the bonding layer thinner than 1/10 of the thickness of the waveguide layer, the warping of the bonding layer and the waveguide layer occurring due to the temperature changes can be reduced. Next, after the optical substrate 1, which is made of a non-linear optical material, has been laminated to the substrate 2 as described above, the optical substrate 1 was abraded. The Cr of which the metal film 9 is made is harder than the Mg-doped $LiNbO_3$ of which the optical substrate 1 is made, so that the abrasion rate of the metal film 9 is smaller than that of the optical substrate 1.

When the metal film 9 is reached during the abrasion of the optical substrate 1, the abrasion rate drops considerably, so that the thickness of the optical substrate 1 is controlled with high precision by the metal film 9. Since the thickness of the protrusions 8 and the metal film 9 formed on the surface of the substrate 2 is 4 μm and 0.5 μm, respectively, and since the thickness of the metal film 10 formed on the surface of the optical substrate 1 is 0.5 μm, the thickness of the optical substrate 1 is controlled to 3.5 μm (see FIG. 4C).

Figure 4D:
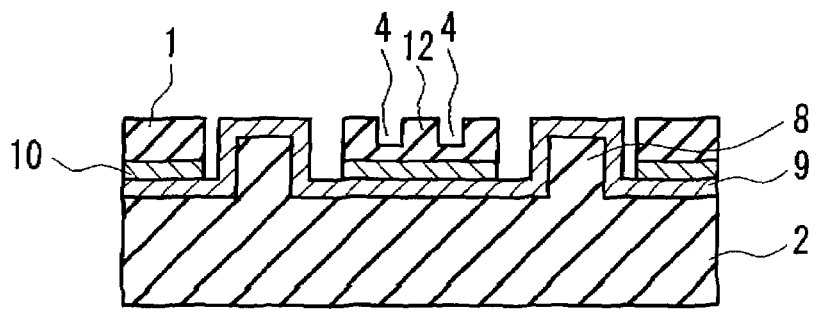

Finally, as shown in FIG. 4D, grooves 4 were formed in the surface of the optical substrate 1 by laser processing. Thus, a ridge-type optical waveguide 12 was obtained.

It is desirable that the protrusions 8 are stripe-shaped and that they are arranged parallel to the ridge-type optical waveguide 12. In this case, the depressions 1c are formed as grooves corresponding to the stripe-shaped protrusions 8.

Furthermore, it is desirable that the distance between the ridge-type optical waveguide 12 and the protrusions 8 is at least 20 μm and at most 100 μm. If the distance between the ridge-type optical waveguide 12 and the stripe-shaped protrusions 8 is less than 20 μm, then the protrusions 8 may affect the guided wave in the ridge-type optical waveguide 12, which may lead to an increase in waveguide loss. If the distance between the ridge-type optical waveguide 12 and the stripe-shaped protrusions 8 is larger than 100 μm, then it is difficult to improve the uniformity of the thickness of the optical substrate 1 due to abrasion.

As described above, protrusions 8 are formed on the surface of the substrate 2 and a Cr film is formed as a metal film 9 thereon, a Cr film is formed as a metal film 10 and depressions 1c are formed in the surface of the optical substrate 1. After fitting the depressions 1c and the protrusions 8 together and laminating the optical substrate 1 and the substrate 2 together, the thickness of the optical substrate 1 is controlled with high precision by abrading the optical substrate 1, and variations in the thickness of the optical substrate 1 of about ±0.1 μm can be attained. As a result, the manufacturing yield of the ridge-type optical waveguide device can be improved considerably. Furthermore, if the optical substrate 1 and the substrate 2 are laminated together by metal bonding, and the metal films 9 and 10 are formed by vapor deposition, then the thickness of the bonded portion of the optical substrate 1 and the substrate 2 can be controlled even more easily and at even higher precision.

Furthermore, when the metal film 9 is reached, the abrasion proceeds suddenly very slowly, and the thickness of the optical substrate 1 is kept for some time at the position of the upper surface of the metal film 9. The abrasion selectivity between the optical substrate 1 and the metal film 9 can be made large by using chemical polishing for the abrasion and intensifying the chemical reaction aspect. If chemical abrasion is employed, then Ni is suitable as the material for the metal film 9, because Ni is chemically stable and not easily abraded.

Consequently, using the method for manufacturing an optical waveguide device of the present embodiment, it is not necessary to abrade the optical substrate 1 while measuring its thickness, so that it is easy to adjust the abrasion time, and a considerable shortening of the manufacturing time can be achieved.

Fifth Embodiment

Figure 5:
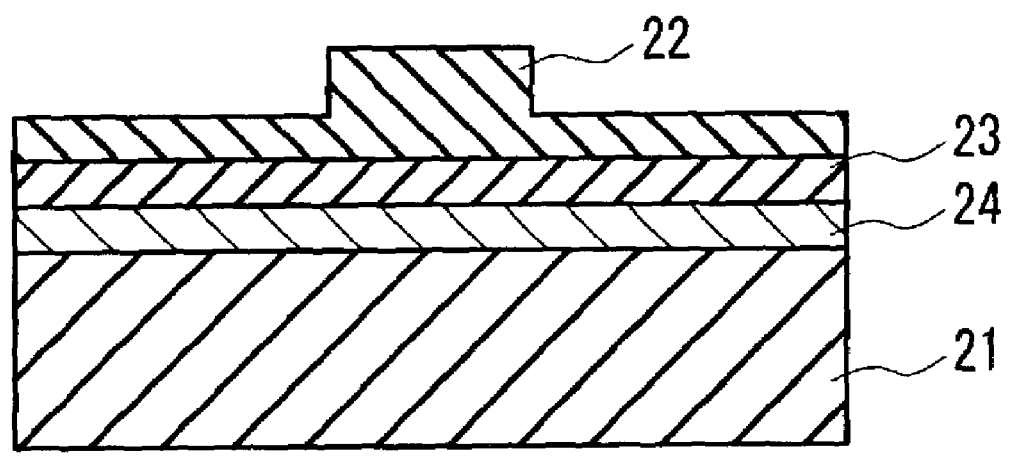
FIG. 5 is a cross-sectional view showing an optical waveguide device according to a fifth embodiment of the present invention.

Next, a fifth embodiment of the present invention is described with reference to FIG. 5. FIG. 5 is a cross-sectional diagram illustrating an optical waveguide device according to the fifth embodiment of the present invention.

As shown in FIG. 5, a bonding layer 24, a buffer layer 23 and a waveguide layer 22 are layered in that order on top of an Mg-doped LiNbO$_3$ substrate 21 of 0.5 mm thickness. Here, the buffer layer 23 has a refractive index and a thickness that is such that the bonding layer 24 does not affect the guided wave that is propagated through the waveguide layer 22. That is to say, the refractive index and the thickness of the buffer layer 23 are set to values at which the electric field distribution of the guided wave propagating through the waveguide layer 22 does not extend to the bonding layer 24. Mg-doped LiNbO$_3$ was used as the material of the waveguide layer 22 and SiO$_2$ was used as the material of the buffer layer 23. In this case, the thickness of the buffer layer 23 needed to be set to at least 0.2 μm. It should be noted that since Mg-doped LiNbO$_3$ was used as the material of the substrate 21 and Mg-doped LiNbO$_3$ was used also as the material of the waveguide layer 22, the thermal expansion coefficients of the substrate 21 and the waveguide layer 22 are the same within the bonding plane. When the thermal expansion coefficients of the substrate 21 and the waveguide layer 22 vary greatly, the waveguide layer 22 is damaged during temperature cycle testing. When the thermal expansion coefficients are the same, the stress during temperature changes is reduced, and the reliability of the optical waveguide device is improved. Furthermore, Ta was used as the material for the bonding layer 24. Conventionally, an adhesive was used for the bonding layer 24, but by using a metal as the bonding layer 24, the heat dissipation and heat balancing properties with regard to heat generated in the waveguide layer 22 could be improved considerably.

Besides Ta, it is also possible to use Cr, Si, W, Ti or the like as the material of the bonding layer 24. Taking the case as an example that this optical waveguide device is used as an optical wavelength conversion element, in particular as a second harmonic generation (SHG) element, the following is an description of the effects of the improved efficiency attained by this optical waveguide device.

In SHG elements using an optical waveguide, a highly efficient wavelength conversion is made possible by confining the guided wave over a long distance at a high power density. Now, the inventors of the present invention confirmed experimentally that a temperature gradient is caused inside the waveguide layer 22 due to the high power density. Here, a quasi-phase-matching SHG element with periodic polarization reversal structure was used as the SHG element, and infrared light of the 820 nm wavelength range was used as the fundamental wave. Using such a fundamental wave and SHG element, violet light (SHG light) of the 410 nm wavelength range is obtained by optical wavelength conversion.

The conversion efficiency of the SHG element is about several % to several 10%. With a fundamental wave power of about 50 mW, SHG light of about several mW, and with a fundamental wave power of about 100 mW, SHG light of at least 20 mW is attained. In this case, the power density of the guided wave in the optical waveguide is several MW/mm$^2$ and the temperature of the optical waveguide increases due to a slight absorption of the guided wave. Also in actual SHG elements, a temperature increase of several ° C. was observed when generating SHG light of at least 10 mW. When a temperature gradient of several ° C. is generated within the SHG element, then a phase-matching wavelength gradient of about 0.1 nm is generated in the SHG element. Since the wavelength tolerance for SHG elements is only about 0.1 nm, when a temperature gradient of several ° C. is generated within the SHG element, the wavelength conversion characteristics are affected considerably, and the output power drops. In order to prevent this, the temperature distribution in the SHG element needs to be equalized.

Here, in the SHG element (optical waveguide device) of this embodiment, a metal is used as the bonding layer 24 for bonding the waveguide layer 22 and the substrate 21. Since metals have a high thermal conductivity coefficient, it was possible to decrease the temperature gradient occurring in the propagation direction of the waveguide layer 22 considerably by using a metal for the bonding layer 24, thus improving the high-power characteristics of the SHG element considerably. That is to say, even when the output of violet light (SHG light) obtained by optical wavelength conversion exceeded 30 mW, there was no drop in the efficiency due to a temperature gradient and no output instabilities, and operation with stable output was possible. In order to prevent deterioration of the characteristics of the SHG element due to a temperature gradient, it is desirable that the entire surface of the SHG element (optical waveguide device) is covered with a material having a temperature conductivity coefficient κ of at least 30 W·m$^{-1}$·K$^{-1}$. Examples of materials having a temperature conductivity coefficient κ of at least 30 W·m$^{-1}$·K$^{-1}$ include lead-free solders such as Au—Sn, Sn—Ag—Cu and Sn—Ag—Cu—In.

The buffer layer 23 is necessary and indispensable for the decrease of waveguide loss. If a metal is used for the bonding layer 24, then the propagation loss of the waveguide layer 22 increases considerably. Consequently, the buffer layer 23 is necessary in order to ensure that the metal used for the bonding layer 24 does not affect the waveguide layer 22. The buffer layer 23 needs to have a small absorption coefficient (transparency) with respect to the guided wave that is propagated along the wave guide layer 22, and a material with an absorption coefficient of not more than $10^{-4}$ should be used for the buffer layer 23. If a buffer layer 23 with a larger absorption coefficient is used, then the propagation loss of the waveguide layer 22 becomes more than 1 dB/cm$^2$, and the characteristics of the SHG element deteriorate. Desirable materials for the buffer layer 23 have a refractive index and an absorption coefficient that are smaller than those of the waveguide layer 22, such as $SiO_2$, $Al_2O_3$, $Ta_2O_5$, and $ZrO_2$, for example.

Furthermore, it is desirable that the waveguide layer 22 fulfills the conditions for single mode propagation with respect to an incident wave, because the conversion efficiency drops considerably if the propagation mode is multimode.

Furthermore, with the present embodiment, it is possible to improve the element characteristics. The characteristics of the SHG element are greatly affected by the homogeneity of the waveguide layer 22. In order to improve the conversion efficiency, it is necessary to maintain the propagation loss of the waveguide layer 22 uniform across the entire waveguide layer 22, and to suppress variations in the thickness precision of the waveguide layer 22 to 1% or less. For this reason, a high precision is required also for the thickness of the bonding layer 24. By using a metal thin film for the bonding layer 24, it is possible to set the thickness of the bonding layer 24 to 0.1 μm or less. And, by using a metal thin film for the bonding layer 24, it is possible to make the variations in the thickness of the bonding layer 24 small. As a result, it was possible to reduce the variations in the thickness of the waveguide layer 22 and to improve the conversion efficiency and the yield.

Furthermore, by using a metal thin film for the bonding layer 24, the reliability of the SHG element was increased considerably. That is to say, when bonding with conventional adhesives, the strength of the bonding layer was problematic. Furthermore, when bonding with conventional adhesives, the waveguide layer 22 was susceptible to warping stress, and this became a cause for poorer reliability of the SHG element. By using a metal film as the bonding layer 24, the hardness of the bonding layer 24 was improved considerably, thus solving these problems. As a result, it became possible to realize an SHG element with high reliability.

An advantageous method for the case that a metal film is used as the bonding layer 24 is, for example, to layer low-melting point metals, such as soldering materials. In particular, it is possible to improve heat dissipation and bonding strength by vapor depositing Au and Sn in alternation and using it as an Au—Sn solder.

Sixth Embodiment

This embodiment describes a case in which an SHG element is actually used for a module. In SHG elements and optical waveguide devices, the coupling portion at which the wave is coupled into the optical waveguide is important. In order to couple the wave from the outside into the optical waveguide, an optical fiber or a light-focusing optical system may be used, but in either case, mismatching occurs at the coupling portion, resulting in loss. This loss at the coupling portion leads to big problems when used in a device.

The first problem is the problem of return light. When a semiconductor laser is used as the light source, then return light is caused by the loss at the coupling portion. When the return light is fed back to the semiconductor laser serving as the light source, then the oscillation state of the semiconductor laser may become unstable, and noise may occur. Ordinarily, noise can be reduced by preventing end face reflections with an anti-reflection film, but if there is a metal film at the coupling end face of the waveguide layer 22 as in the fifth embodiment, then it is difficult to prevent end face reflections with an anti-reflection film.

A second problem is the problem of end face destruction. When a high power wave of several 10 mW or more was coupled into the optical waveguide, the problem of end face destruction occurred. Clarifying the cause for this, it was found that when there is a metal film near the coupling end face of the waveguide layer 22 as in the fifth embodiment, then the wave is absorbed at this portion, the temperature increases locally, and this becomes a cause for the problem of end face destruction.

These problems occur due to a slight shift of the mode matching between the guided wave and the coupled wave at the coupling portion of the optical waveguide, but it is difficult to let the modes perfectly match at the coupling portion, and it became clear that even if such perfect mode matching were possible, similar problems would occur due to slight positional shifts. That is to say, the fact that there is a metal film near the coupling end face of the waveguide layer makes it difficult to couple the wave into the optical waveguide. In view of the above, the inventors of the present invention conceived of the structure shown in FIG. 6. In the structure shown in FIG. 6, the bonding layer (metal film) 24 near the in-coupling portion 26 of the optical waveguide is removed, thus avoiding the above problems.

Figure 7A:
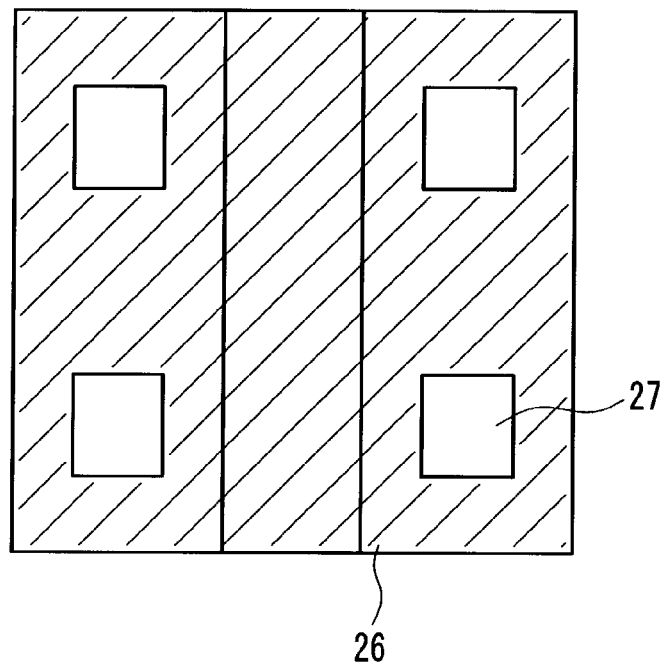
FIG. 7A is a plan view and FIG. 7B is a cross-sectional view of another optical waveguide device according to the sixth embodiment of the present invention.
Figure 7B:
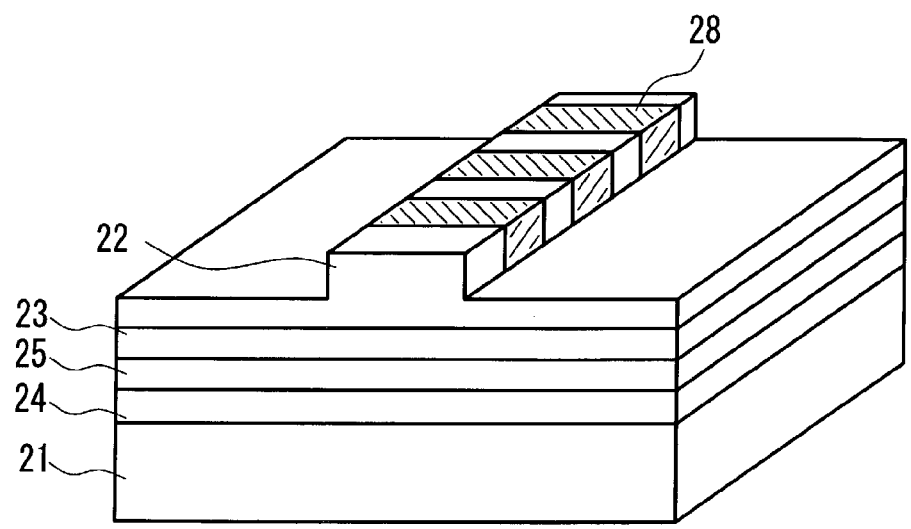

Furthermore, the above problems can also be avoided by employing the structure shown in FIGS. 7A–B. In the structure shown in FIGS. 7A–B, a second buffer layer 25, which is a thick-film buffer layer, is interposed between the buffer layer 23 (first buffer layer) and the bonding layer (metal film) 24. Making the thickness of this second buffer layer 25 at least 1 μm makes it possible to move the metal film serving as the bonding layer 24 further away from the optical waveguide, thus realizing a structure in which the incident wave in the coupling portion does not contact the metal film. If a thick-film buffer layer is used, then it takes time to deposit such a film, so that a high-speed film forming method is employed. In general, films with high film formation speed pose the problem that the propagation loss is large when used as optical thin films. In order to address this problem, a low-loss film is deposited as the first buffer layer 23, and the waveguide layer 22 is bonded to the substrate 21 via the second buffer layer 25.

Another problem arises when the element is fixed. Devices using optical waveguides have to be fixed in some way when used, because when the size of the optical waveguide is as small as about several microns, positioning at sub-micron precision becomes necessary, and a stable fixation becomes indispensable. Furthermore, for direct coupling to the light-focusing optical system or the semiconductor laser, or coupling to an optical fiber, sub-micron precision is necessary for the coupling adjustment, and the fixation after the adjustment requires a method, with which the coupling shifts are small and which can be terminated in short time. Ordinarily, such methods use a UV curing resin.

Figure 8A:
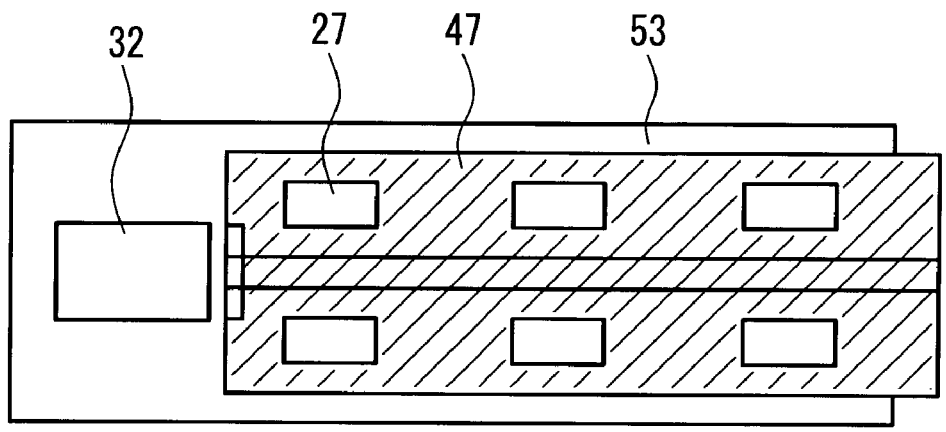
FIG. 8A is a plan view and FIG. 8B is a cross-sectional view of a coherent light source according to the sixth embodiment of the present invention.
Figure 8B:
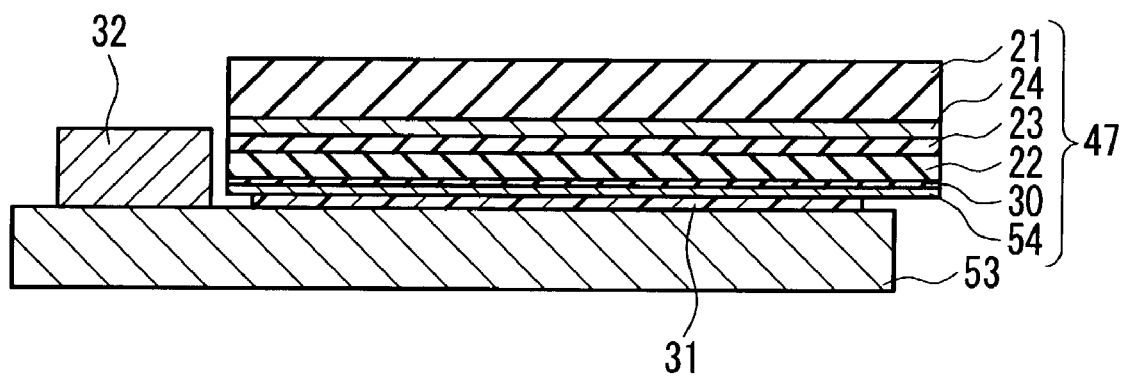

FIGS. 8A–B shows a coherent light source in accordance with the present embodiment, in which a semiconductor laser and an optical waveguide device have been integrated into one module. As shown in FIGS. 8A–B, a semiconductor laser 32 and an SHG element 47, which is an optical waveguide device, have been fixed on an Si submount 53.

Here, the semiconductor laser 32 is fixed on the Si submount 53 by soldering, and the SHG element 47 is fixed on the Si submount 53 using a UV curing resin (adhesive) 31.

Figure 6A:
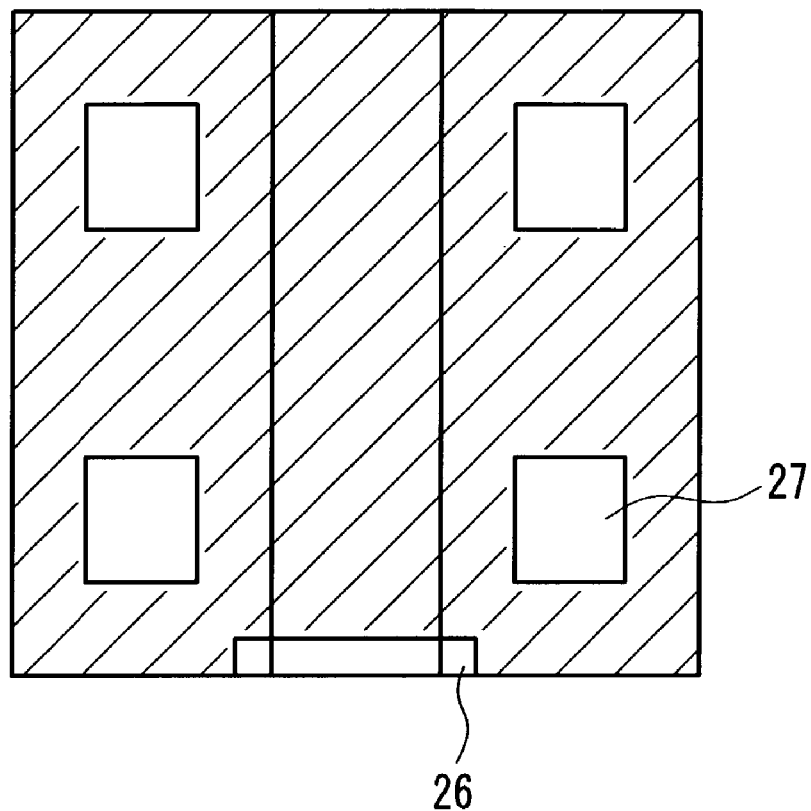
FIG. 6A is a plan view and FIG. 6B is a cross-sectional view of an optical waveguide device according to a sixth embodiment of the present invention.
Figure 6B:
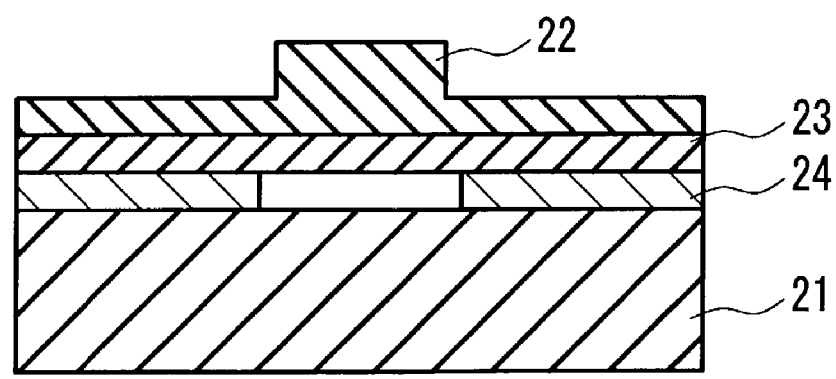

When a metal was used for the bonding layer 24, there was the problem that adhering the SHG element 47 serving as the optical waveguide device to the Si submount 53 (module base) was difficult. This was because the metal serving as the bonding layer 24 absorbs UV light, so that UV light cannot be irradiated properly onto the UV curing resin 31. To address this problem, the present embodiment adopts a structure in which window portions 27 for letting UV light pass are provided in the bonding layer 24, as shown in FIGS. 6 to 8. Providing these window portions 27 makes it possible for UV light to pass, and to adhere and fix the SHG element 47 to the Si submount 53.

Here, the window portions 27 are provided in regions that are not directly below the optical waveguide, which ensures that uniform thermal properties with regard to the heat generated in the optical waveguide can be promoted by the metal serving as the bonding layer 24. Moreover, the inventors of the present invention found that by adhering only regions outside the optical waveguide, that is, only regions corresponding to the window portions 27, a deterioration of the element characteristics due to warping occurring during the fabrication of the module can be prevented. Deterioration of the element characteristics is a phenomenon that occurs because the optical waveguide is warped due to adhesion stress when the SHG element 47 is adhered and fixed to the Si submount 53, which leads to a refractive index gradient. By providing the window portions 27, the influence of the adhesion stress on the optical waveguide can be reduced by performing the adhesion at a region outside the optical waveguide, so that a deterioration of the element characteristics can be prevented.

Moreover, as shown in FIG. 8, if the SHG element 47 serving as the optical waveguide device and the Si submount 53 (module base) are adhered and fixed using a UV curing resin (adhesive) 31, then it is advantageous to use a low-melting point metal as the bonding layer 24. By using a low-melting point metal, it was possible to promote a uniform temperature distribution of the SHG element 47 and to realize stable element characteristics even during high powers. If a low-melting point metal is used as the bonding layer 24, then it is desirable that the surface of the SHG element 47 is covered with a metal thin film, as this increases the adhesive strength. Moreover, in this case, a buffer layer 30 should be deposited on the upper surface of the waveguide layer 22, and the metal thin film 54 should be deposited on top of the buffer layer 30, as shown in FIG. 8B.

For the SHG element, it is desirable to use a quasi-phase-matching SHG element with periodic polarization reversal regions 28, as shown in FIG. 7B. Providing periodic polarization reversal regions 28 realizes a highly efficient wavelength conversion. Referring to FIGS. 9A–B and 10A–D, the following describes a method for forming the periodic polarization reversal regions. The method for forming the periodic polarization reversal regions varies greatly depending on the crystal orientation of the optical substrate.

Figure 9A:
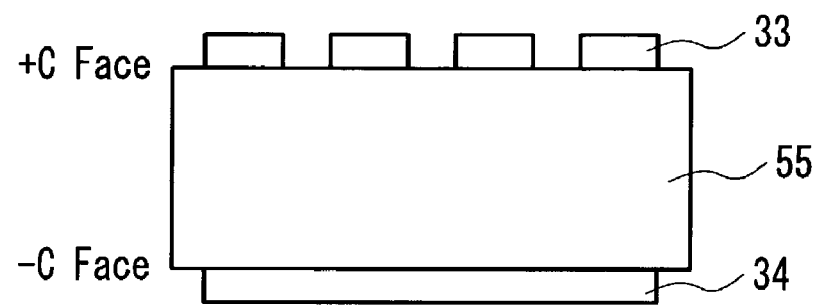
FIG. 9 is a process diagram illustrating a method for manufacturing the periodic polarization reversal regions of an SHG element serving as an optical waveguide device according to the sixth embodiment of the present invention.
Figure 9B:
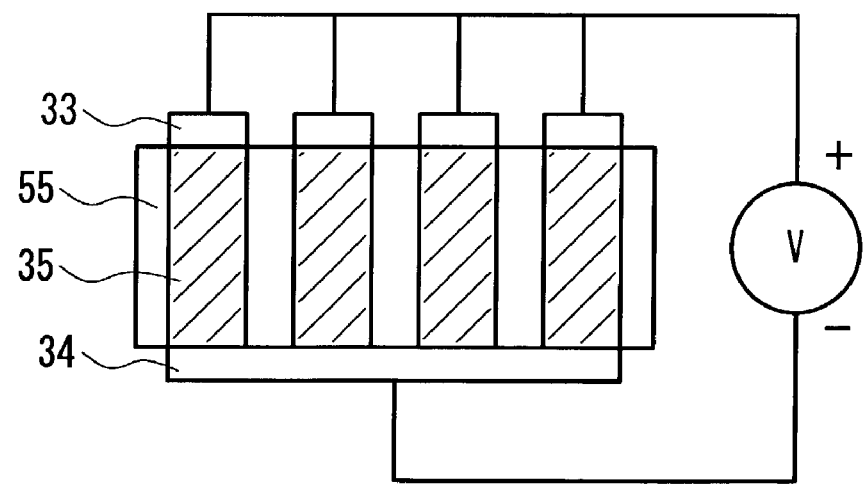

FIGS. 9A–B illustrates the case in which the optical substrate 55 is a z cut substrate. In z cut substrates, the polarization direction of the crystal is perpendicular to the surface of the substrate. In this case, first a pattern of periodic electrodes 33 is formed on the +C face of the optical substrate 55, and a plane electrode 34 is formed on the −C face, as shown in FIG. 9A. Here, a metal was used for the electrode material, and the pattern of the periodic electrodes 33 was formed by photolithography. Next, as shown in FIG. 9B, the spontaneous polarization of the crystal of the optical substrate 55 is reversed by applying a high voltage between the periodic electrodes 33 and the plane electrode 34. The applied voltage causes a pulsed electrical field, and by applying pulses of several ms to several 100 ms or a dc voltage to which a pulse voltage is superimposed, the spontaneous polarization of the crystal is reversed, and the periodic polarization reversal regions 35 are formed. The size of the applied voltage depends on the type of crystal. Crystals in which polarization reversal regions can be formed easily are for example $LiNbO_3$ and $LiTaO_3$, and with these crystals, a voltage of about 20 kV/mm should be applied. On the other hand, if the crystal is Mg-doped $LiNbO_3$ or stoichiometric $LiNbO_3$ or $LiTaO_3$ or the like, then an applied voltage of several kV is sufficient. After the periodic polarization reversal regions 35 have been formed in the manner described above, the optical waveguide is formed by abrading the optical substrate 55 with the abrasion method of the present invention.

Figure 10A:
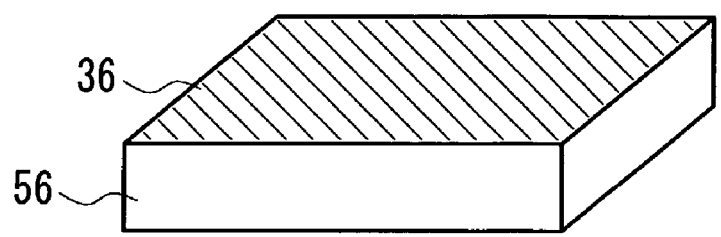
FIG. 10 is a process diagram illustrating another method for manufacturing the periodic polarization reversal regions of an SHG element serving as an optical waveguide device according to the sixth embodiment of the present invention.
Figure 10B:
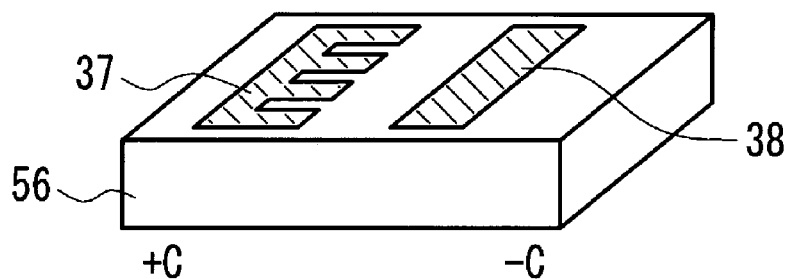
Figure 10C:
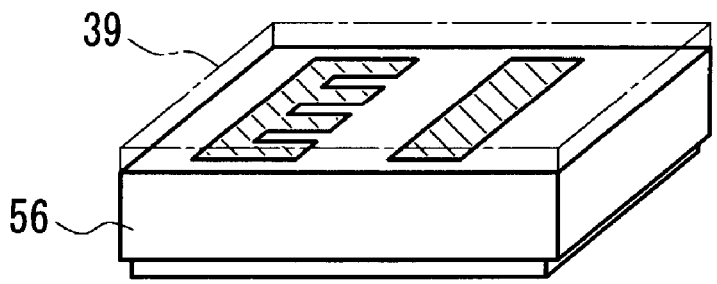
Figure 10D:
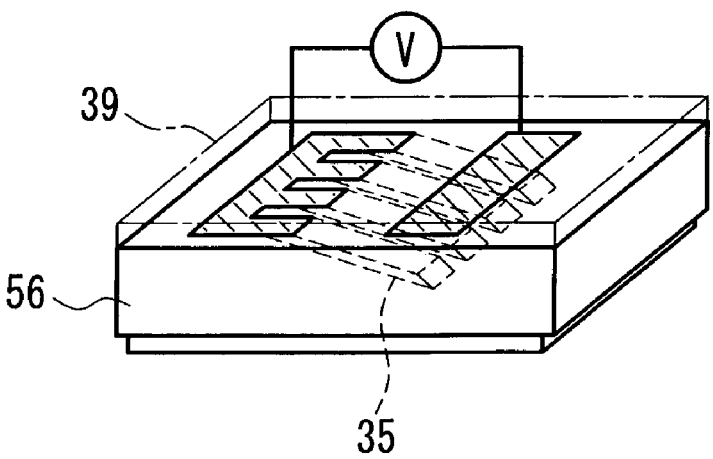

FIGS. 10A–D illustrates the case in which the optical substrate 56 is an X or Y cut substrate or an off-cut substrate. In the case of X or Y cut substrates, the polarization direction of the crystal is parallel to the surface of the substrate. In the case of off-cut substrates, the polarization direction of the crystal is tilted at a certain angle with respect to the surface of the substrate. In this case, the electrodes are formed on the surface of the optical substrate 56. More specifically, a metal film 36 is formed on the surface of the optical substrate 56, as shown in FIG. 10A. Here, a Ta film is formed for example. Then, as shown in FIG. 10B, the metal film 36 is processed into a comb-shaped electrode 37 and a stripe electrode 38 by photolithography. Here, the comb-shaped electrode 37 and the stripe electrode 38 are formed such that an electric field can be applied in the polarization direction of the crystal, and the comb-shaped electrode 37 is formed on the +C axis side of the crystal. Next, as shown in FIG. 10C, the comb-shaped electrode 37 and the stripe electrode 38 are covered by an insulator 39. Covering the comb-shaped electrode 37 and the stripe electrode 38 with an insulator 39 increases the uniformity of the periodic structure of the resulting polarization reversal regions 35 (see FIG. 10D) considerably. Next, as shown in FIG. 10D, a high voltage is applied between the comb-shaped electrode 37 and the stripe electrode 38, thus reversing the spontaneous polarization of the crystal and forming the periodic polarization reversal regions 35. After the periodic polarization reversal regions 35 have been formed in this manner, the SHG element is obtained by forming the optical waveguide.

Seventh Embodiment

Figure 11:
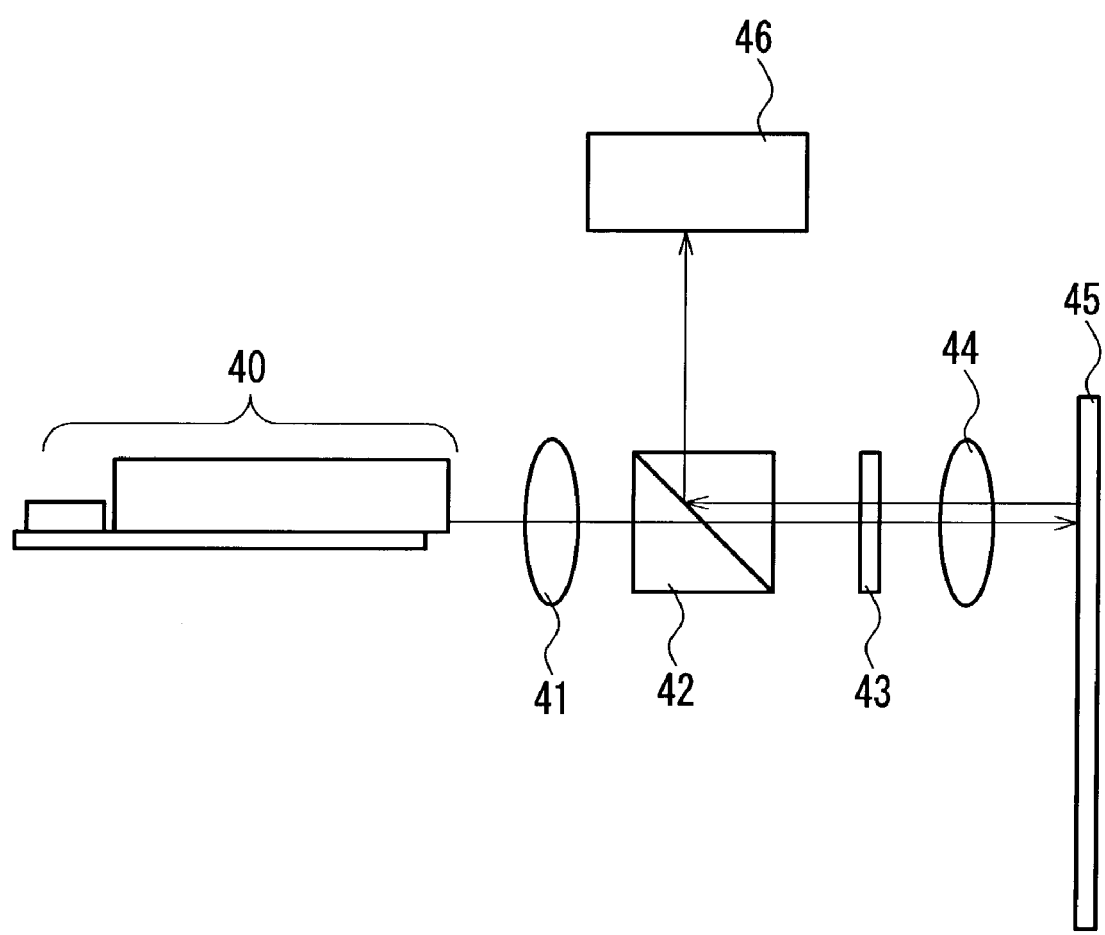
FIG. 11 is a diagram showing an optical apparatus according to a seventh embodiment of the present invention.
Figure 12:
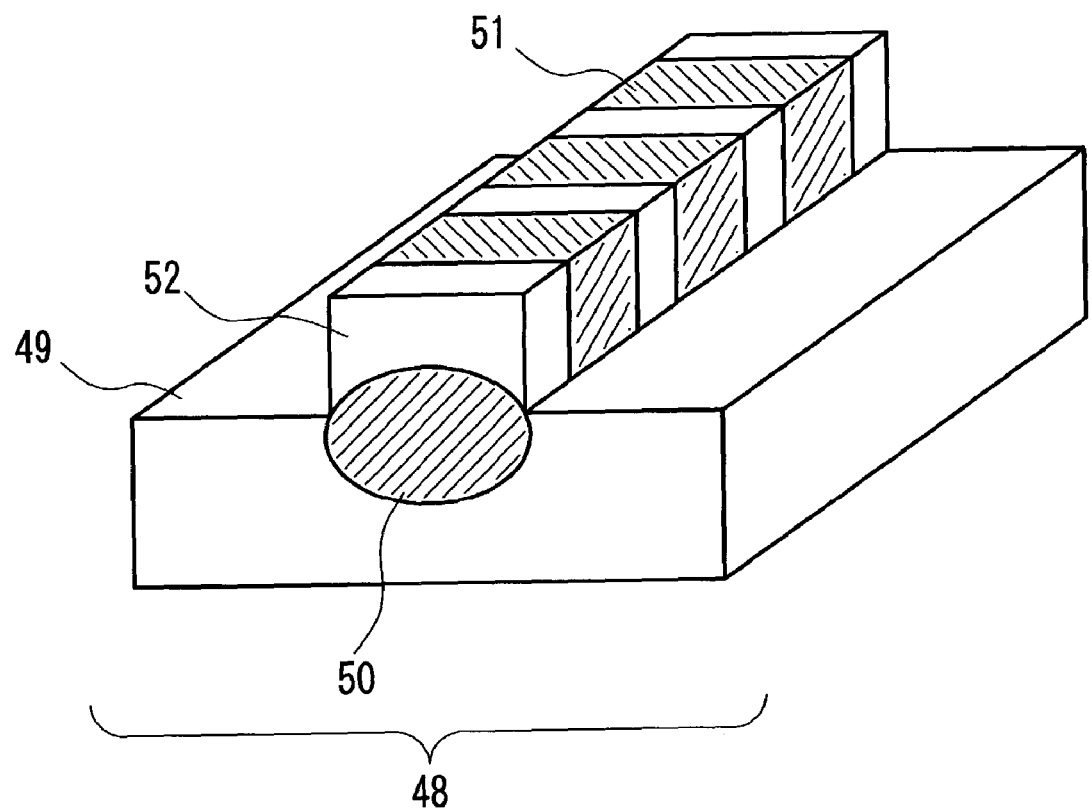
FIG. 12 is a perspective view illustrating the configuration of a ridge-type optical waveguide device.
Figure 13A:
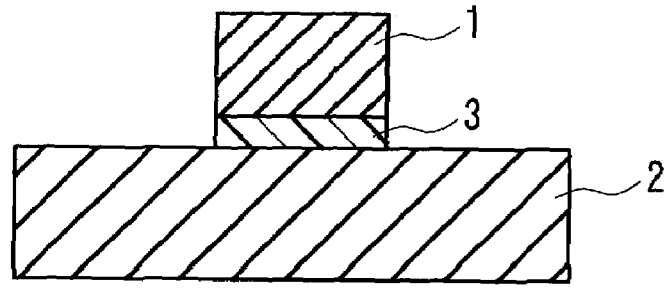
FIG. 13 is a process diagram illustrating a method for manufacturing a ridge-type waveguide device.
Figure 13B:
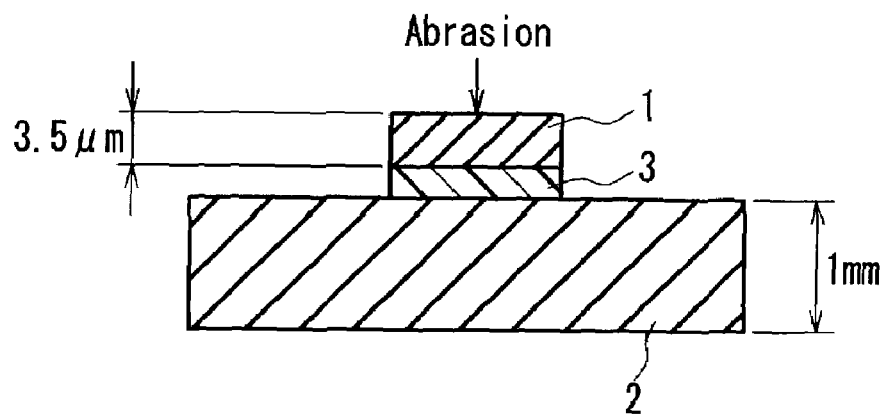
Figure 13C:
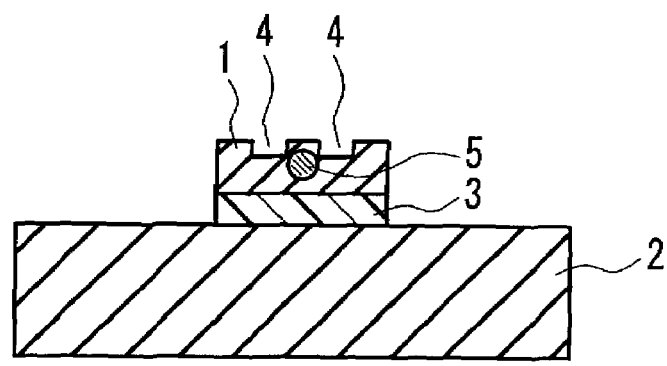

Next, a seventh embodiment of the present invention is described with reference to FIG. 11. FIG. 11 is a diagram illustrating an optical apparatus in accordance with a seventh embodiment of the present invention.

As shown in FIG. 11, the optical apparatus according to this embodiment is configured of a coherent light source 40 made of the semiconductor laser and the optical wavelength conversion element shown in FIG. 8, a collimator lens 41, a polarization beam splitter 42, a $\lambda/4$ plate 43, a focusing lens 44 serving as a light-focusing optical system that focuses light emitted from the coherent light source 40 on an optical disc 45 serving as the observed object, and a photo-detector 46 detecting reflected light from the optical disk 45.

The light that is emitted from the coherent light source 40 is collimated into parallel light by the collimator lens 41, and focused by the focusing lens 44 onto the surface of the optical disk 45. The polarization angle of the light reflected by the optical disk 45 is rotated by 90° by the λ/4 plate 43, so that it is reflected towards the photo-detector 46 by the polarization beam splitter 42. The reflected light from the optical disk 45 is thus detected by the photo-detector 46, and information on the optical disk 45 is reproduced.

The coherent light source 40 can generate light of a short wavelength of 410 nm, so that optical information can be recorded at high densities. Furthermore, by using metal for the bonding layer of the optical wavelength conversion element of the optical waveguide device, it was possible to realize a high-power coherent light source 40. That is to say, it was possible to generate short-wavelength light with a power of at least 50 mW and to write onto two-layer optical disks, which is difficult with lower-power light sources. Furthermore, writing at high speeds was also possible.

It should be noted that in this embodiment, a light-pickup optical system was given as an example of an optical apparatus, but the optical apparatus of the present invention also can be applied to other coherent optical systems, such as those for laser scanning microscopes.

As described above, with the method for manufacturing an optical waveguide device according to the present invention, it is possible to control the thickness of the optical substrate precisely and to reduce variations in the thickness of the optical substrate. As a result, the manufacturing yield of the optical waveguide device is improved. Furthermore, it is not necessary anymore to measure the thickness of the optical substrate while abrading, so that the adjustment of the abrasion time becomes easy, and a shortening of the manufacturing time can be achieved. Furthermore, the configuration of the optical waveguide device of the present invention uses a metal for the bonding layer that bonds the waveguide layer to the substrate, so that the temperature gradient occurring in the propagation direction of the waveguide layer can be reduced considerably, and for example the high-power characteristics when using the optical waveguide device as an SHG element can be improved considerably. Furthermore, using a metal for the bonding layer reduces the variations in the thickness of the bonding layer. As a result, variations in the thickness of the waveguide layer are reduced, and when the optical waveguide device is used for example as an optical wavelength conversion element, it is possible to improve the conversion efficiency and the yield. Furthermore, the configuration of the coherent light source of the present invention uses the optical waveguide device according to the present invention, which improves the high-power characteristics when used for an SHG element, and uses the optical waveguide device according to the present invention, which improves the conversion efficiency when used for a wavelength conversion element, so that a short-wavelength high-power coherent light source can be realized. Furthermore, the configuration of the optical apparatus of the present invention uses the short-wavelength high-power coherent light sources of the present invention, so that writing onto two-layer optical disks, which is difficult with low-power light sources, becomes possible.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A optical waveguide device, comprising
a waveguide layer;
a buffer layer formed on one surface of the waveguide layer; and
a substrate bonded to a surface of the buffer layer via a bonding layer;
wherein the bonding layer is made of metal, and the waveguide layer comprises a periodic polarization reversal structure.

2. The optical waveguide device according to claim 1, further comprising a stripe-shaped protrusion on at least one of a top surface and a bottom surface of the waveguide layer, wherein the waveguide layer including the protrusion fulfills the conditions for single-mode propagation with respect to an incident light wave.

3. The optical waveguide device according to claim 1, wherein the buffer layer is made of a dielectric material that has an absorption coefficient of not greater than $10^{-4}$ with respect to a guided wave that is propagated by the waveguide layer, and the refractive index and the thickness of the buffer layer are set to values at which the electric field distribution of the guided wave propagated by the waveguide layer does not extend into the bonding layer.

4. The optical wavegwde device according to claim 1, wherein the bonding layer has a multi-layer structure in which different kinds of metals are layered, and the metals constituting the bonding layer include a soldering material.

5. The optical waveguide device according to claim 2,
wherein the bonding layer includes window portions at which a predetermined portion of the bonding layer has been removed; and
wherein the window portions are provided at regions that are not directly below the stripe-shaped protrusion.

6. The optical waveguide device according to claim 1, wherein the thermal expansion coefficients of the substrate and the waveguide layer are substantially the same within a bonding plane.

7. The optical waveguide device according to claim 1, wherein the optical waveguide device is a wavelength conversion device that converts the wavelength of a fundamental wave to its second harmonic wave, and the buffer layer is made of a material that is transparent with respect to the fundamental wave and the second harmonic wave.

8. The optical waveguide device according to claim 1,
wherein the waveguide layer is made of an off-cut substrate of Mg-doped $LiNbO_3$, and has a periodic polarization reversal structure, and a fundamental wave propagated by the waveguide layer is converted into its second harmonic wave; and
wherein the buffer layer has an absorption coefficient that is not greater than $10^{-4}$ with respect to the fundamental wave and the second harmonic wave, and is thick enough that the electrical fields of the fundamental wave and the second harmonic wave do not extend into the bonding layer.

9. A coherent light source, comprising
a submount;
a semiconductor laser fixed on the submount; and
an optical waveguide device according to claim 1 fixed on the submount;
wherein light from the semiconductor laser is coupled into the waveguide layer of the optical waveguide device.

10. The coherent light source according to claim 9, wherein the optical waveguide device is fixed on the submount with a UV curing resin.

11. The coherent light source according to claim 9, further comprising a protective film on a surface of the optical waveguide device.

12. The coherent light source according to claim 9, wherein the optical waveguide device is covered by a material with a thermal conductivity coefficient of at least 30 $W \cdot m^{-1} \cdot K^{-1}$.

13. An optical apparatus, comprising:
  a coherent light source according to claim 9;
  a light-focusing optical system that focuses light emitted from the coherent light source onto an observed object.

14. The optical apparatus according to claim 13, wherein the observed object is an optical disk.

* * * * *

UNITED STATES PATENT AND TRADEMARK OFFICE
CERTIFICATE OF CORRECTION

PATENT NO. : 6,999,668 B2
APPLICATION NO. : 10/336416
DATED : February 14, 2006
INVENTOR(S) : Yokoyama et al.

It is certified that error appears in the above-identified patent and that said Letters Patent is hereby corrected as shown below:

Col. 20, line 25: "wevegwde" should read --weveguide--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,999,668 B2 Page 1 of 1
APPLICATION NO. : 10/336416
DATED : February 14, 2006
INVENTOR(S) : Yokoyama et al.

It is certified that error appears in the above-identified patent and that said Letters Patent is hereby corrected as shown below:

Col. 20, claim 4 line 25: "wavegwde" should read --waveguide--

Signed and Sealed this

Sixth Day of March, 2007

JON W. DUDAS
*Director of the United States Patent and Trademark Office*